United States Patent [19]

Fedeli

[11] Patent Number: 4,736,575
[45] Date of Patent: Apr. 12, 1988

[54] RIDE-ON ROTARY LAWNMOWER
[75] Inventor: Luisa Fedeli, Milan, Italy
[73] Assignee: Siag S.p.A., Milan, Italy
[21] Appl. No.: 870,707
[22] Filed: Jun. 4, 1986

Related U.S. Application Data

[63] Continuation-in-part of Ser. No. 678,648, Dec. 6, 1984, abandoned.

[51] Int. Cl.[4] ............... A01D 34/64; A01D 34/70
[52] U.S. Cl. ............................. 56/202; 56/320.2; 56/DIG. 22
[58] Field of Search ............... 56/16.6, 202, 320.2, 56/15.8, DIG. 22

[56] References Cited

U.S. PATENT DOCUMENTS

| | | | |
|---|---|---|---|
| 3,408,798 | 11/1968 | Hale et al. | 56/DIG. 22 |
| 3,837,157 | 9/1974 | Van Der Lely | 56/202 X |
| 4,041,678 | 8/1977 | Chaney et al. | 56/DIG. 22 X |
| 4,106,269 | 8/1978 | Knudson | 56/DIG. 22 X |

Primary Examiner—George A. Suchfield
Attorney, Agent, or Firm—Bucknam and Archer

[57] ABSTRACT

An improved ride-on rotary lawnmower comprises a cutter device having one or more blades rotating about an axis substantially perpendicular to the ground and contained in a downwardly open casing provided with a rear duct for the discharge of cut grass. The casing of the cutter device of the lawnmower is mounted between front wheels and rear wheels. The bottom of the rear duct of the cutter casing is closed by a wall pivoted about the rear lower side of the duct. A rear grass box is carried either by the casing of the cutting device or by the frame of the lawnmower. A roller is located in the space between the two rear wheels and always in contact with the ground independently from the height from the ground of the cutter casing. The roller occupies the entire space between the rear wheels but does not extend laterally of the rear wheels. The axis of the roller lies in the vertical plane which passes through the axis of the rear wheels and is not displaced to any substantial extent from this axis. The roller may be carried by the frame of the lawnmower or is pivoted at the rear of the cutter casing. In both cases the roller may be loaded by springs connected with the frame of the lawnmower in order to increase the weight on the roller and reduce the weight of rear wheels up to an almost even distribution of weight on rear wheels up to an almost even distribution of weight on the ground. The bottom wall of the casing rear duct straddles the roller, in order to convey grass into the grass box.

5 Claims, 4 Drawing Sheets

RIDE-ON ROTARY LAWNMOWER

This application is a continuation-in-part of U.S. Ser. No. 678,648 filed Dec. 6, 1984, now abandoned.

The present invention relates to an improved rotary lawnmower of the type having a seat for the driver. Various types of rotary lawnmowers are commercially available, including self-propelled ride-on lawnmowers.

These lawnmowers have a motor which directly or indirectly drives one or more cutter blades to turn about an axis substantially perpendicular to the ground, and also powers the drive transmission for propelling the lawnmower. Self-propelled ride-on lawnmowers are usually constituted by a frame which carries the motor, the drive transmission to the driving wheels, which are usually the rear wheels, the steering device, which usually acts on the front wheel or wheels, the seat for the driver, the control members for actuating and adjusting the moving parts of the transmission, the grass cutter device and if provided, the grass box for collecting the cut grass.

The grass cutter device is usually constituted by a casing or cowling which encloses the cutter blade or blades from above and the sides. This casing serves to prevent the operator of the lawnmowing machine from coming accidentally into contact with the rotary blades and also acts to prevent any grass or foreign bodies thrown from the blades, when in rotation, from being projected out of the lawnmower in undesired directions which may be dangerous.

The casing is often formed with an outlet opening which allows the cut grass to pass out from the machine in a predetermined direction either on one of the two sides of the lawnmower machine or towards the rear of the machine. Both arrangements permit the fitting of a suitable cut grass collector box. The grass box is very important, to ensure a good cleaning of the sword and regular growth of the grass itself.

To adapt the machine to various practical working requirements the operator must be able to adjust the height of cut of the grass by displacing the lawnmower casing upwards or downwards, but parallel to the ground. Such displacement must not be difficult or tiring for the operator and must be easily effected from the driving position.

The grass box can be carried either by the grass cutter casing or by the frame of the machine. In the first case, the grass box will be displaced upwardly and downwardly with the lawnmower whenever the driver varies the height of the cut, while in the second case the height of the grass box will remain the same independently of the height of cut of the grass.

It is very important to make sure that the surface of the lawn be as clean as possible from cut grass debris, because they would create a mat damaging the growth of the lawn. It has also been found that the lawn is improved by a periodic and uniform compression of the lawn surface by rotating means and that the best grass collection is through a rear grass box, into which the rotating blade (or blades) throw the cut grass.

In every lawn mower the two rear wheels are performing the compressing operation, but the entire rear load of the lawnmower is now on the two strips compressed by the two rear wheels, giving a very uneven compressing action. In order to ensure a more even distribution of the rear load of the lawnmower along the entire cut surface, it is necessary to insert, between the two rear wheels, a structure loaded by part of the rear load of the lawnmower and capable of carrying out a compressing operation of the surface of the lawn situated between the two rear wheels of the lawnmower. One possible solution is a roller located in the space between the two rear wheels and sufficiently long so as to fill the greater part of the space between the rear wheels; it is then important to find the way to transfer a part of the lawnmower's load from the two rear wheels to the roller; one solution is to insert springs between the frame and the roller's supports, in order to load the roller with a controlled load; another solution is to have the roller carrying the rear of the casing and if necessary increasing its load with springs between the casing and the frame. This second solution requires that the rear roller be pivoted to the rear of the cutting casing and be controlled by the height adjustment lever through proper linkages. This solution will permit the roller to perform also the function of helping the leveling of the cutting casing but will not solve completely the problem, because the roller is not long enough to provide a side-to-side leveling mechanism so that the leveling problems have to be fully solved with other means.

The present invention provides a lawnmower which is very efficient in cutting, collecting the grass in the rear and compressing the lawn's surface immediately after cutting.

In order to make sure that all clippings of cut grass be conveyed into the grass catcher and that they do not fall down along their path from the edge of the rotating blade to the inlet of the grass box, it is advantageous to put, in the lower part of the rear grass discharge duct of the lawnmower casing, a wall or a diaphragm pivoted about an axis so as to close the lower side of the duct, preventing clippings of cut grass from falling down on their way to the grass box and to help the cleaning of the duct from clippings of cut grass every time the operator empties the grass box.

When the lawnmower is provided with the wall discussed hereinabove, the grass collection is very efficient and the surface of the cut lawn is clean immediately after the blade cutting operation; consequently it is possible to design the lawnmower in such a way as to carry out, immediately after the blade cutting operation also the operation of compressing the lawn surface.

SUMMARY OF THE INVENTION

According to the invention a lawnmower comprises cutting means provided with one or more blades rotating about an axis substantially perpendicular to the ground and housed in a downwardly open casing provided with a rear duct for the discharge of cut grass, the cutting means being carried by a motor vehicle having ground engaging wheels, in which the casing of the cutting means is mounted on the machine between the front and rear wheels of the vehicle, and the rear duct has its lower side closed by a wall or a diaphragm pivoted about the rear lower end of the duct. The wall or diaphragm closes the bottom of the duct during the cutting operation and can be lifted in the direction of the grass box when the operator empties the grass box. A rear grass box is provided, carried either by the casing of the cutting means or by the frame of the lawnmower and a roller which is always in contact with the ground independently of the height from the ground at which the casing is adjusted at any one time. The roller must be long enough as to fill the entire space between the two rear wheels. The axis of the roller lies in the vertical plane passing through the axis of the rear wheels and is not substantially displaced from this axis. The roller may be carried by the frame of the lawnmower and may be loaded by springs or other resilient means, intended to transfer part of the load on the rear wheels to the roller to make as even as possible the load on the ground throughout the cut section, not only where the rear wheels compress the ground. The roller may also be carried on support arms which, by suitable levers and connecting rods, are connected to the device by means of which the operator adjusts the height of the cut.

The axis of the roller is positioned as close as possible to the vertical plane passing through the axis of the rear wheels, which are usually the driving wheels so that the transverse thrusts caused by non-rectilinear movement of the lawnmower are reduced. With the roller according to the present invention it is also possible to transfer a part of the weight of the lawnmower casing and also that of the grass box if this is carried by the lawnmower casing onto the ground, via the roller. Several advantages result from this feature that a part of the weight of the grass cutting machinery falls on the roller. In the first place it makes the operation of adjusting the height of cut upwardly easier since the operator must physically raise only a part of the casing. In the second place, the roller transfers onto the ground a part of the total weight of the machine, thus relieving the rear wheels. This fact guarantees superior appearance to the surface of the grass after cutting, but, above all, permits to act more effective on the sword because the action of rolling distributed between the roller and wheels favors the regularity of the subsequent growth of the grass.

In the third place the roller, being wide and loaded, ensures a good adherence of the lawnmower casing to the ground and an optimum precision in following the irregularities of the ground, thus simultaneously reducing the irregularities in cutting and the risk of uprooting the grass in the case of very low cutting on a slightly irregular ground.

If required, the load on the roller may be increased, directly or indirectly, by means of springs interposed between the frame of the machine and the lawnmower casing. In this case, a part of the weight of the machine is transferred through the springs onto the lawnmower casing and thus, onto the roller, rather than on the rear wheels. In this manner a more uniform distribution of the load on the ground and therefore a better regularizing action on the sword is achieved. Naturally, it is very important that the lawnmower casing, and therefore the roller connected to it, be adequately fixed against transverse displacements with respect to the direction of movement of the vehicle.

The rear roller also permits to project outwardly away from the lawnmower unexpected loose objects located on the sword because they would obstruct the cut grass outlet. In order to make sure that all cut grass clippings enter the grass box, a movable wall or diaphragm must be arranged in the lower part of the outlet duct of the cut grass, but above the roller. This wall or diaphragm must be pivoted at the lower rear end of the duct. Thus, it is possible to install on the lawnmower a linkage permitting the operator to rotate the wall or diaphragm to empty the cut grass while he opens the grass box or immediately after the grass box emptying operation. In this manner, the bottom of the grass duct is closed, during the cutting operation, and no clippings of grass will fall on the lawn surface. If clippings of grass remain in the interior of the duct, at its bottom, the lifting of the wall or diaphragm will empty it every time the operator will empty the grass box. In this manner, the surface of the lawn will always be free of clippings of cut grass and the compression of the lawn surface will improve, without damaging the lawn surface.

BRIEF DESCRIPTION OF THE DRAWINGS

The embodiments of the invention will now be more particularly described, by way of example, with reference to the accompanying drawings, in which.

DESCRIPTION OF A PREFERRED EMBODIMENT

Figure 1:
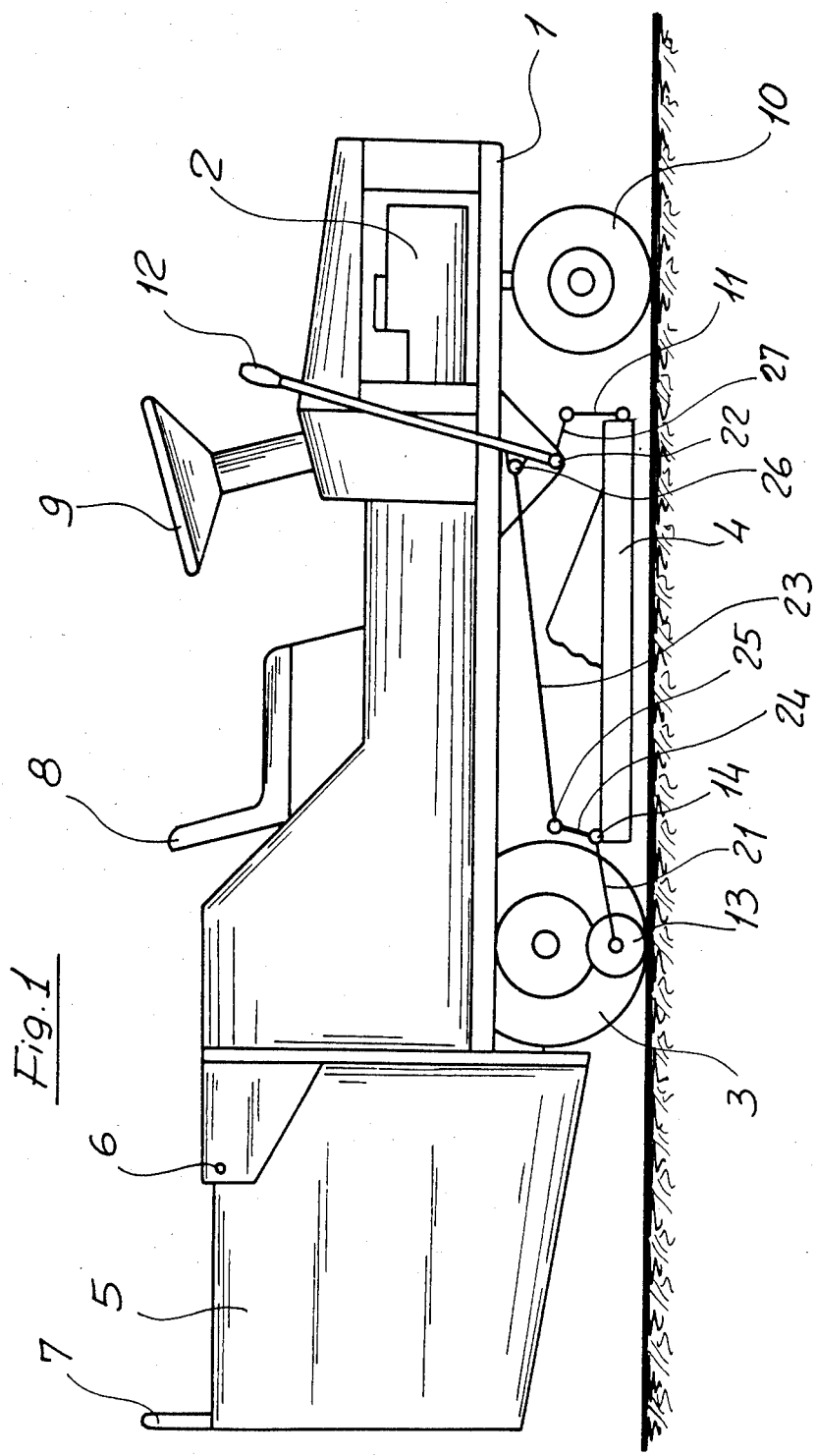
FIG. 1 is a schematic sectional view of the region of the rear wheels of a ride-on lawnmower provided with a rear grass box and with the addition of a rear roller having means for the adjustment of the height of the cut on the lawnmower casing. In order to show the linkages of the height of cut which can be adopted when the rear roller is part of the height of the cut adjustment system, the rear duct has been cut off and the drawing does not show the lower wall or diaphragm.

With particular reference now to the drawings, the lawnmower constituting the subject of the present invention is constituted by a frame 1 which carries the major part of the components of the ride-on rotary lawnmower and, in particular, a motor 2 which, through appropriate mechanisms, operates both the transmission members to the rear driving wheels 3 and one or more rotary cutter blades rotating parallel to the ground and enclosed, above and to the sides, by a casing 4.

The blades when turning cut the grass and can project it into a suitable container or grass box 5 supported by the frame of the machine and pivoted about the pin 6 in such a way that the driver can turn it by gripping the handle 7 while remaining seated on the seat 8. While remaining on the seat 8 the driver can also steer the lawnmower by means of a steering wheel 9 connected to a directional wheel or wheels 10. Still remaining seated, the driver can vary the distance from the lawnmower casing 4 to the ground by means of a suitable device which acts on the casing itself.

The casing is connected at the front to the frame 1 by means of arms 11. This connection ensures that the lawnmower casing moves with the machine while it permits the regulation of the height of cut by raising the front part of the lawnmower casing, controlled by the operator, by means of the lever 12 and the arm 27 rigidly connected to the lever 12. When the roller 13 is supported by the rear part of the cutter casing 4, linkages connect the lever 12 to the rear roller 13. Specifically the axis of the roller 13 is pivotally connected at 14 on the rear part of the lawnmower casing 4 by a pair of arms 21. The lawnmower casing 4 is raised and lowered by a manually operated control which includes operator's handle or lever 12. Lever 12 is secured at its lower end for pivotal movement with a shaft 22 mounted on the frame 1. A pair of horizontal links 23 is pivotally connected to the lower part 26 of the lever 12. The links 23 are pivotally connected to the rear part 14 of the lawnmower casing 4 by a pair of arms 24 for pivotal movement about transverse pivot axis 25. Arms 21 and 24 are stationary with respect to each other. The rear part of the lawnmower casing 4 is lowered and raised by moving the control lever 12 rearwards or, respectively, forwards. In this manner the roller determines the height of the rear part of the cutter casing and part of the weight of the casing is carried by the roller.

Figure 2:
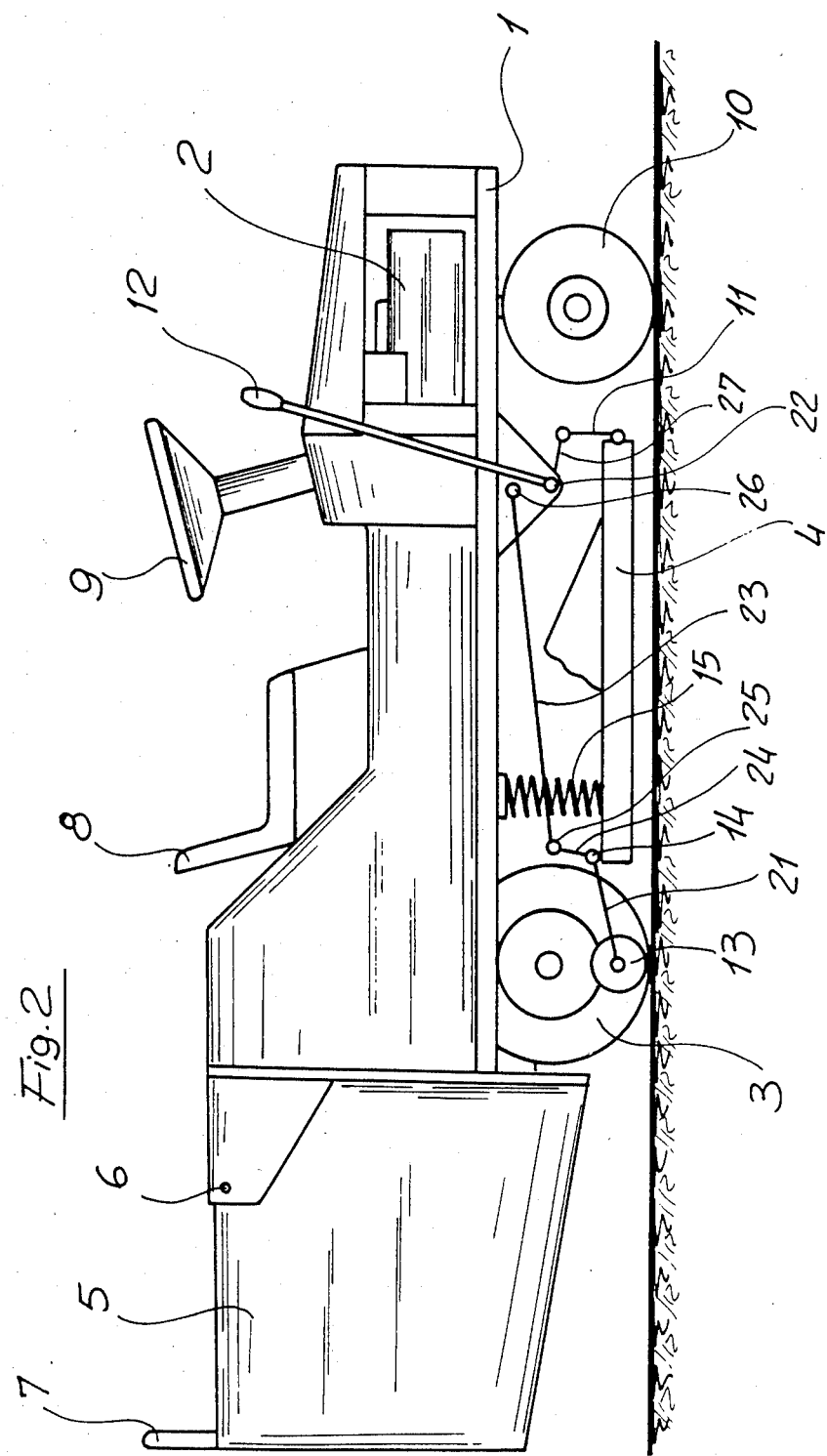
FIG. 2 illustrates a lawnmower as in FIG. 1, in which the rear part of the cutter casing is loaded by springs connected to the frame of the lawnmower, in order to increase the load on the roller and to reduce the load on the rear wheels, thus making the load on the ground as even as possible.

FIG. 2 shows an embodiment in which there are interposed, between the frame of the lawnmower machine and the lawnmower casing, springs 15 for the purpose of transferring a part of the weight of the machine onto the rear part of the lawnmower casing and, therefore, a suitable part of the weight of the machine. This is done to improve the uniformity of the action of compaction of the sword without entirely losing the grip or traction of the rear driving wheels, which is indispensable in order to be able to control the movements of the lawnmower.

Figure 3:
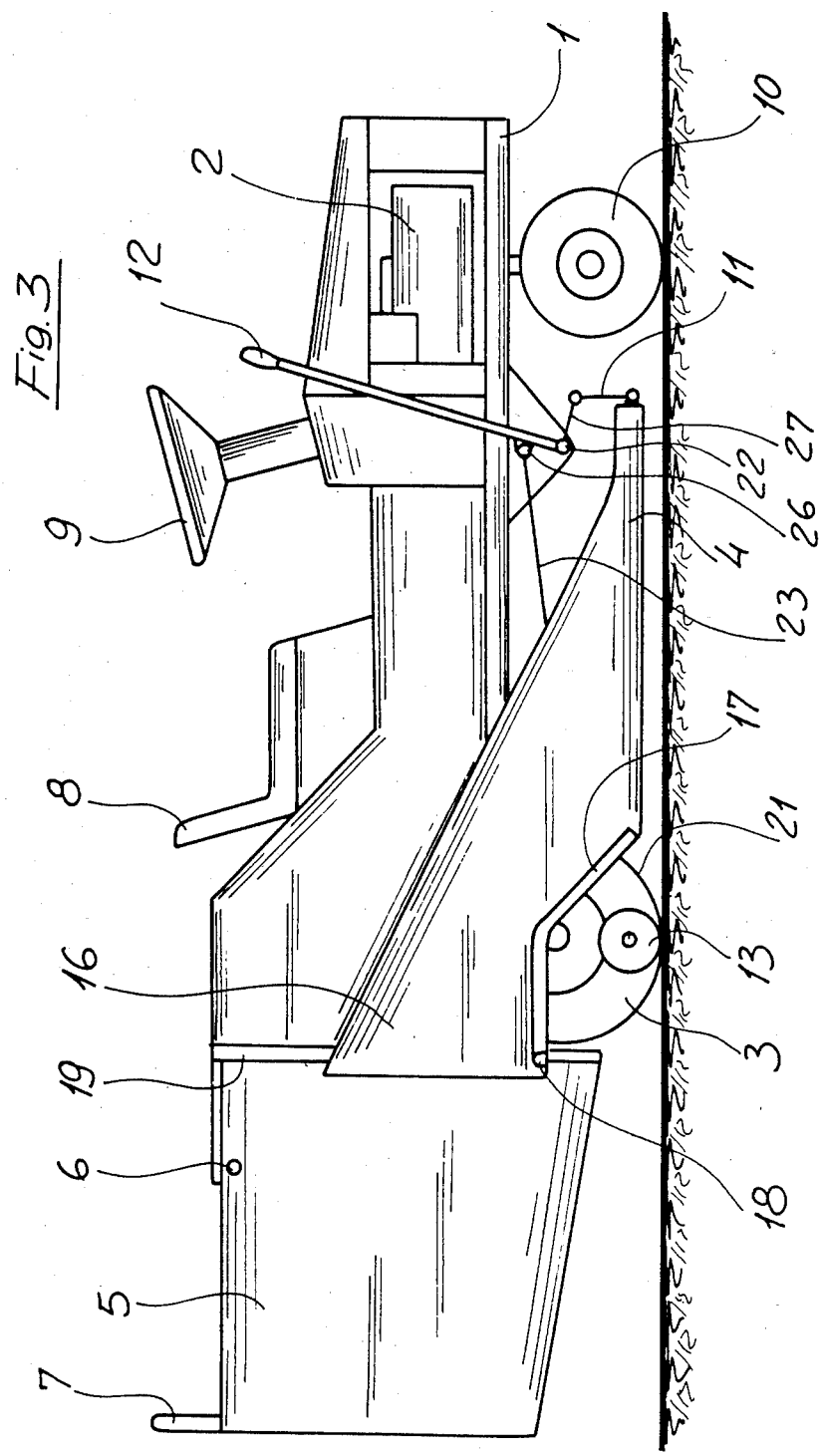
FIG. 3 illustrates a lawnmower as in FIG. 1, in which is shown the section of the rear duct with the bottom wall or diaphram closed and the grass box closed, and shows that the movable wall or diaphragm, pivoted at the bottom rear of the duct, straddles the roller.

FIG. 3 shows, in section, the rear part of the lawnmower casing and of the grass box, in which, in the lower, rear part of the grass discharge duct 16 is pivoted a wall 17 which can turn about an axis 18, the wall extending transversely with respect to the grass discharge duct. The wall 17 is maintained during the grass cutting operation in the position indicated in FIG. 3, and ensures that the grass itself is conveyed into the grass box and does not fall onto the roller and out from the grass box. When the grass box is full, the residual cut grass will remain in the discharge duct 16, deposited on the wall 17.

Figure 4:
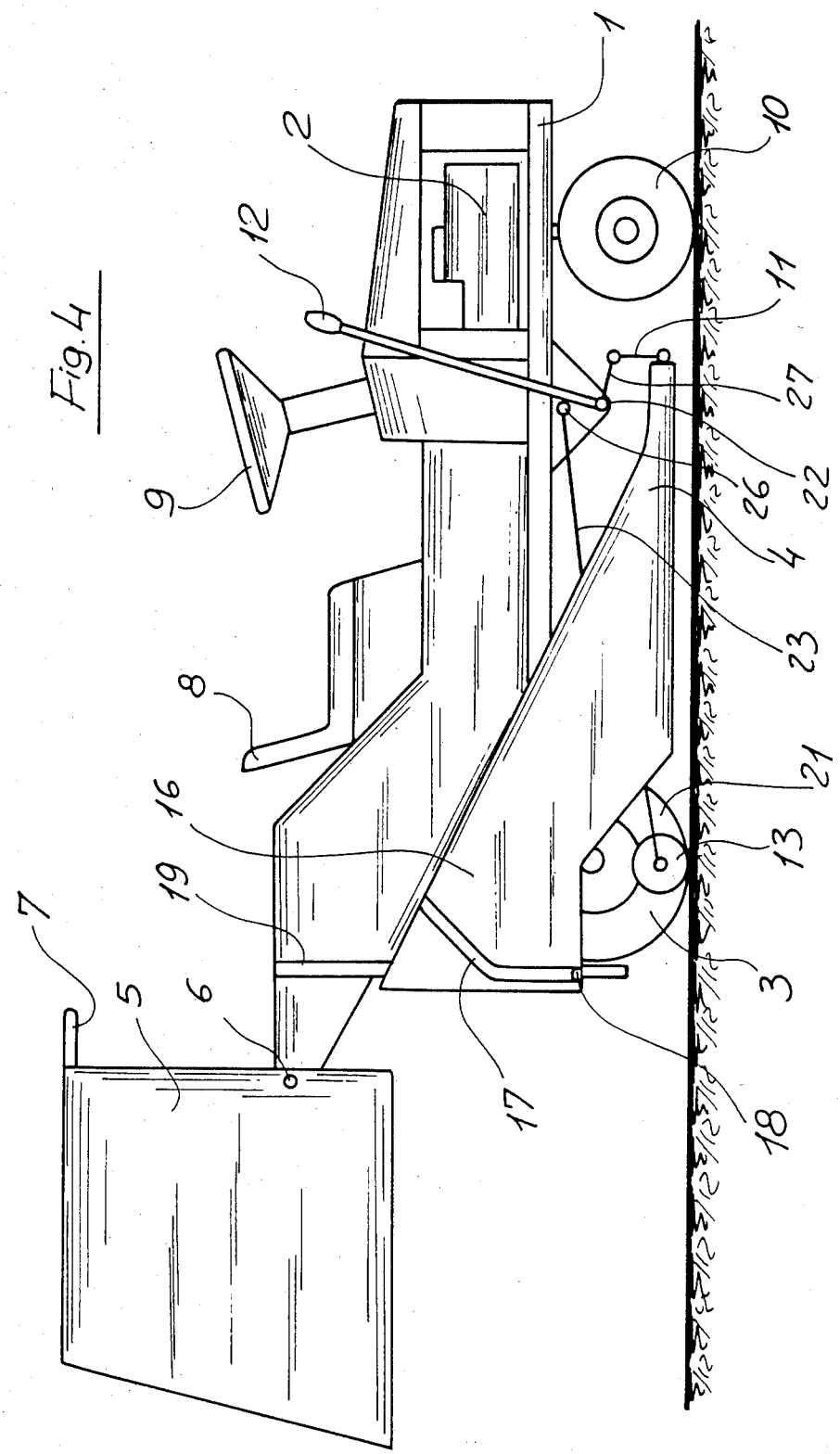
FIG. 4 represents the lawnmower of FIG. 3, with the grass box completely raised for emptying and the bottom wall or diaphragm lifted for emptying the duct from clippings of grass.

At this point it is necessary for the operator to empty the grass box by turning the handle 7 about the axis 6 in such a way that the mouth of the grass box becomes separated from the frame of the machine and becomes oriented downwardly. FIG. 4 shows the grass box turned for emptying and the wall 17 also turned for emptying the grass which had remained deposited there during the last cutting. This is possible because the grass box 5 is connected to the wall 17 in such a way that the rotation of the wall 17 and the rotation of the grass box 5 take place simultaneously or subsequently, but in such a manner that the evacuation of the cut grass is total. Evidently, this constitutes also a safety device against occasional objects which the rotating blades can project, because the wall 17 can be formed so as to completely close the grass discharge duct from above, leaving open only the lower part which is not dangerous in the event of objects being thrown from the rotating blades.

In FIGS. 1 and 2 it is shown that the roller 13 is sufficiently wide as to occupy almost the space between the two rear wheels. However, the roller does not extend laterally of the rear wheels. The roller has an axis lying in the vertical plane passing through the axis of the rear wheels and not very much displaced from the axis. This is to reduce the transverse thrusts on the roller when the machine is travelling in a curve, a fact which occurs frequently in lawnmowing operations. Even when this arrangement is used, it is still necessary to secure the lawnmower casing against transverse displacements, for example, by guiding the discharge duct 16 into the space of the rear wall 19 of the frame. In this way, the improved operation of the sword will be guaranteed since practically the entire strip of the lawn on which removal of grass has been effected by the rotating blades is immediately rolled and levelled by the passage of the roller in the central portion of the cut strip and by the two rear wheels on the two outer portions of the cut strip. Further the grass is compressed on the surface of the lawn. The combination of the roller, the movable wall or diaphragm, the grass box allows to remove all the cut grass in the grass box, in the rear of the lawn mower, rather than on the sides.

A suitable calibration of the roller loading system, by means of the springs 15, permits a more uniform distribution of the loads between the rear driving wheels and the rear roller, in such a way that the pressing action on the lawn is as uniform as possible. In this manner, while the risk arising from extraneous objects projected from the rotating blades is reduced to the minimum, both the collection of grass and the maintenance of the lawn is optimized. In order to ensure the efficiency of the lawnmower, the wall pivoted at the bottom of the rear duct, which straddles the roller, is necessary. The roller may be carried by the frame of the lawnmower or by the cutter casing. The roller does not come in contact with the cut grass clippings.

The structure described hereinabove for a ride-on lawnmower may be easily applied to a pedestrian controlled lawnmower in which, for practical reasons, it is desirable to maintain the arrangement for transmission of drive to the wheels, while reserving to the roller the function of directing the load onto the ground and, consequently, providing greater uniformity in the surface of the lawn.

What is claimed is:

1. A lawnmower comprising a frame, a motor mounted on the frame, front wheels and rear ground-engaging wheels, cutting means including at least one blade rotating about an axis substantially perpendicular to the ground; a downwardly open casing connected to the front of the frame positioned between said front wheels and said rear wheels and provided with a duct for the discharge of cut grass, said cutting means being housed within said casing. a grass box in communication with said duct and supported by said casing, a roller pivoted at the rear of the casing and filling the space between said rear wheels and always in contact with the ground independently of the height from the ground at which said casing is adjusted at any one time, said rear wheels having an axis, a vertical plane passing through said axis, and said roller has an axis positioned as close as possible to said vertical plane so that a part of the weight of the lawnmower is borne by said roller, a movable wall pivotally mounted on said duct and straddling said roller during the cutting operation, whereby cut grass is conveyed through said duct to said grass box, and does not come in contact with said roller during the cutting operation and said wall is raised to empty the duct when the grass box is full.

2. A lawnmower comprising a frame, a motor mounted on the frame, front wheels and rear ground-engaging wheels, cutting means including at least one blade rotating about an axis substantially perpendicular to the ground; a downwardly open casing connected to the front of the frame positioned between said front wheels and said rear wheels and provided with a duct for the discharge of cut grass, said cutting means being housed within said casing; a grass box in communication with said duct and supported by the frame of the lawnmower, a roller supported by said frame and filling the space between said rear wheels and always in contact with the ground independently of the height from the ground at which said casing is adjusted at any one time, said rear wheels havivg an axis, a vertical plane passing through said axis, and said roller has an axis positioned as close as possible to said vertical plane so that a part of the weight of the lawnmower is borne by said roller, a movable wall pivotally mounted on said duct and straddling said roller during the cutting operation, whereby cut grass is conveyed through said duct to said grass box, and does not come in contact with said roller during the cutting operation and said wall is raised to empty the duct when the grass box is full.

3. The lawnmower according to claim 1 wherein said lawnmower comprises arms (11) connecting said casing (4) to the front of said frame (1), lever (12) movable by the operator of said lawnmower and arms (21) (24) stationary with respect to each other, horizontal rods (23) connected to said arms (24), said arms 24 being connected to said arms (21), said rods 23 being connected to the lower part of said lever (12), and said arms (21) connect said roller (13) to the rear part of said casing (4).

4. The lawnmower according to claim 1 including resilient means acting between the roller and the frame to transfer to said roller a part of the weight of the lawnmower.

5. The lawnmower according to claim 2 including resilient means acting between the roller and the frame to transfer to said roller a part of the weight of the lawnmower.

* * * * *